³,⁰⁶⁹,⁴³⁶

UNITED STATES PATENT OFFICE 3,069,436
PROCESS FOR THE PRODUCTION OF THE 17β-FORMATE OF 17α-ETHINYL-19-NOR TESTOSTERONE
Ulrich Kerb, Berlin-Charlottenburg, and Martin Schenck, Berlin-Frohnau, Germany, assignors to Schering AG., Berlin, Germany
No Drawing. Filed Dec. 11, 1959, Ser. No. 858,850
Claims priority, application Germany Dec. 16, 1958
1 Claim. (Cl. 260—397.4)

The present invention relates to formic acid esters of 1-alkinyl-cycloalkanols and more particularly to these new formic acid esters and to methods of producing the same.

It has been found that formic acid esters of 1-ethinyl-cyclohexanols or 1-ethinyl-cyclopentanols cannot be produced through formylation of the alcoholic hydroxyl-compound by known means. By warming the above mentioned cyclic tertiary 1-ethinyl-alkanol with concentrated formic acid it has been found that instead of the hoped for esterification, an intramolecular rearrangement (for example a Rupe-rearrangement or a Meyer-Schuster-rearrangement) takes place. The casual connection between this unexpected reaction of the above mentioned tertiary ethinyl carbinol becomes apparent in the first place with the inclusion of the central carbinol carbon atom into a ring, since the open chain methyl-ethyl-ethinyl-carbinol, or in other words 3-methyl-pentine (1)-ol-(3), under comparable conditions still produces the formic acid ester in a normal reaction.

It is accordingly a primary object of the present invention to provide for the production of formic acid esters of 1-alkinyl-cycloalkanols.

It is another object of the present invention to provide a new series of compounds, namely formic acid esters of 1-alkinyl-substituted or unsubstituted-cycloalkanols.

It is still another object of the present invention to provide a method of producing the formic acid esters of this invention.

Other objects and advantages of the present invention will be apparent from a further reading of the specification and of the appended claim.

With the above and other objects in view, the present invention mainly comprises a method of producing formic acid esters having the following general formula:

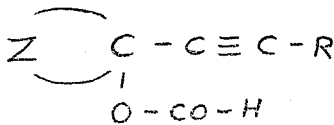

wherein R is selected from the group consisting of hydrogen and monovalent hydrocarbon radicals and wherein Z is selected from the group consisting of substituted and unsubstituted divalent hydrocarbon radicals of 4–6 carbon atoms, comprising the steps of reacting a compound having the following general formula:

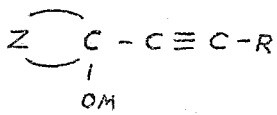

wherein R and Z have the same definitions as above and wherein M is selected from the group consisting of hydrogen and alkali metals with formyl fluoride at low temperature so as to form the corresponding formic acid ester of the compound, and recovering the thus formed formic acid ester.

The new compounds of the present invention have the following general formula:

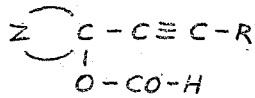

wherein R and Z have the same definitions as above. Thus, in accordance with the present invention, a compound having the following general formula:

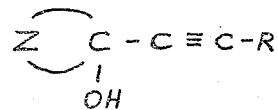

i.e. a 1-ethinyl-cycloalkanol, preferably in the form of its alkali metal alcoholate, is reacted with formyl fluoride preferably in an inert liquid organic medium such as a solvent-like tetrahydrofurane, dioxane or ether, at low temperatures, preferably at a temperature of −80 to −60° C. to form the corresponding formic acid ester.

In the above formula the substituent R may be hydrogen or a monovalent hydrocarbon radical, preferably a lower alkyl such as methyl. The substituent Z may be a non-substituted divalent hydrocarbon radical of 4–6 carbon atoms, e.g. of the following general formula:

$(CH_2)_n<$

Thus, the substituent Z may be a cycloalkylene of the following formula:

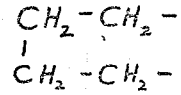

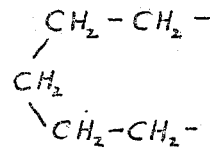

or

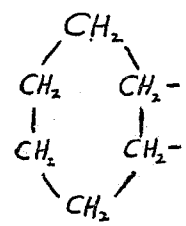

The substituent Z may also be a divalent hydrocarbon radical of 4–6 carbon atoms which is substituted in part with a cyclopentanopolyhydrophenanthrene ring system so that the overall compound is of the steroid type. In such case, for example, the formic acid ester of the present invention will have the following general formula:

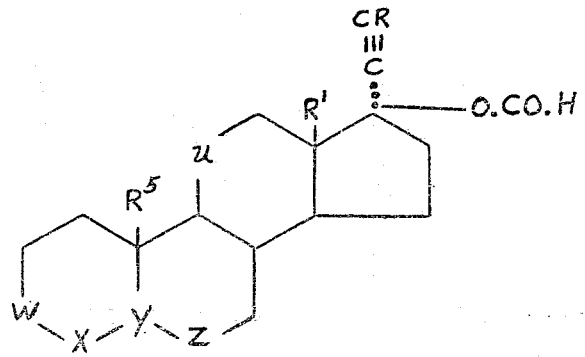

wherein R is selected from the group consisting of hydrogen and lower alkyl, wherein $R^1$ is selected from the group consisting of hydrogen and methyl, wherein $R^5$ is selected from the group consisting of hydrogen and methyl, wherein U is selected from the group consisting of —$CH_2$—, —CHOacyl—, —CHOH— and —CO—, wherein W is selected from the group consisting of —$CH_2$—, —CO—, —$CHOR^2$— wherein $R^2$ is selected from the group consisting of hydrogen and lower alkyl, and

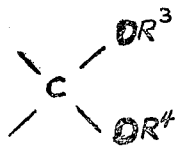

wherein $R^3$ by itself is selected from the group consisting of hydrogen and lower alkyl, $R^4$ by itself is lower alkyl, and $R^3$ and $R^4$ together are alkylene, and wherein

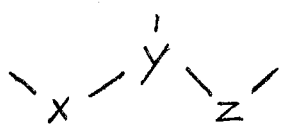

is selected from the group consisting of:

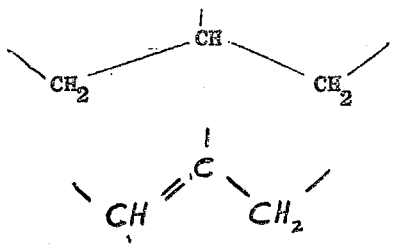

and

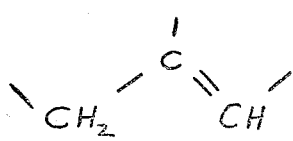

It is apparent from the above that the basis of the present invention is applicable to reactions with formyl fluoride and any compound of the following general formula:

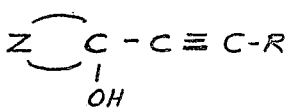

wherein Z is any substituted or unsubstituted divalent hydrocarbon radical of 4–6 carbon atoms. When Z is a substituted:

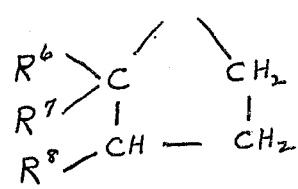

wherein $R^6$ is methyl and $R^7$ and $R^8$ together are:

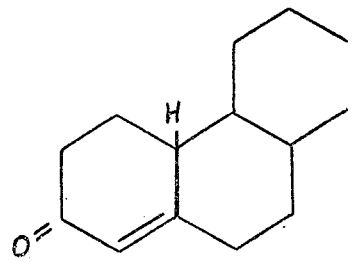

then the resulting compound of the present invention will be:

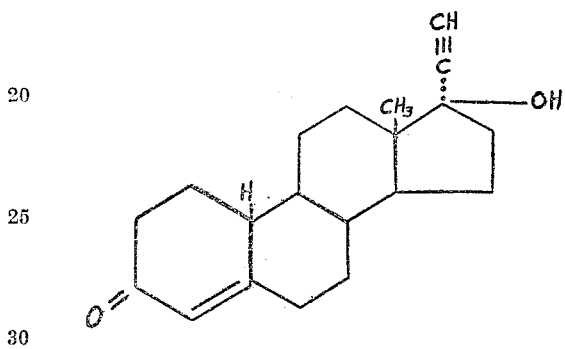

Or the molecule of the starting cycloalkanol compound contains a reactive group, for example an α,β-unsaturated keto group as in the 3-keto group of the above steroid, this group is preferably first blocked by the conversion thereof into an intermediate derivative such as a ketal or an enol-ether, in known manner, and then after the reaction the blocked compound is further reacted to obtain the final compound with the 3-keto group.

This is illustrated by the following equations:

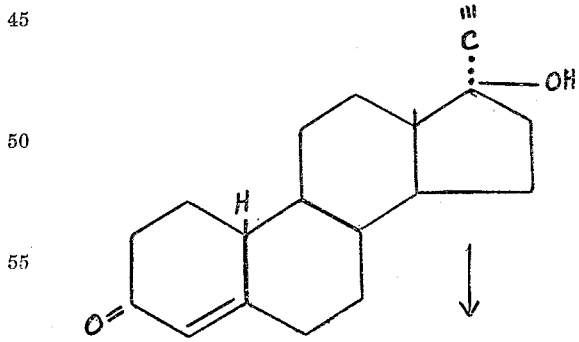

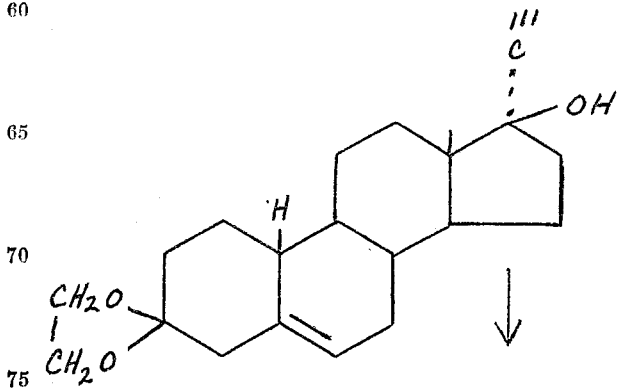

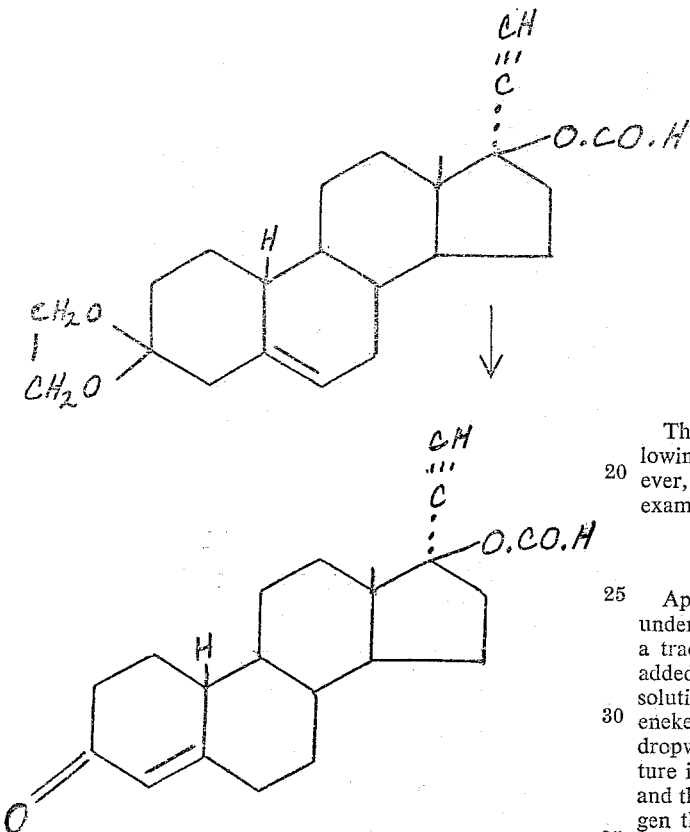

As indicated above, it is preferable to react the formyl fluoride with the alkali metal alcoholate of the 1-alkinyl-cycloalkanol. The alkali metal alcoholate is preferably prepared by introducing the ethinyl-cycloalkanol dissolved in an organic solvent into a solution of approximately 1 mol of alkali metal amide in liquid, water-free ammonia, and subsequently driving off the ammonia by passing dry nitrogen through it.

The formyl fluoride is then introduced in at least equimolar amounts under stirring preferably at a temperature of −80 to −60° C. into the remaining solution or suspension of the alcoholate. After completion of the reaction, which despite the very low temperature is ended in a short time, the formed formiate is separated and recovered in normal manner, for example, by evaporation of the solvent, preferably at low temperature and reduced pressure, and if necessary purified by known methods. In the event that a sensitive group has been blocked by the formation of an intermediate compound, the blocking group is removed in normal manner.

The formic acid esters of the present invention are in themselves an extremely valuable group of substances, and in addition, these formic acid esters serve as intermediates in the production of other valuable substances. In general, the formic acid esters of the present invention may be used for the very same purposes as the basic 1-alkinyl-cycloalkanol from which the formic acid esters are derived, with, however, several advantages. Thus, the formic acid esters have an improved solubility as compared to the compounds from which they are derived, and in addition, the esterified hydroxyl group can be easily freed whereby an intermediate protection in the use of the cycloalkanols as intermediate products for the production of technically valuable end products is achieved. Furthermore, where the basic 1-alkinyl-cycloalkanol from which the formic acid ester is derived itself has physiological properties, e.g. in the case of the steroids, then the formic acid esters of the present invention have an increased physiological activity as compared to the compounds from which it is derived, and also as compared to corresponding esters of other carboxylic acids.

The present invention is further illustrated by the following examples. The scope of the invention is not, however, meant to be limited to the specific details of the examples.

EXAMPLE 1

*17α-Ethinyl-19-Nortestosterone-Formiate*

Approximately 100 cc. of liquid ammonia are mixed under stirring at a temperature of −80 to −60° C. with a trace of iron(III)-nitrate and 250 mg. of sodium are added. As soon as the dark blue color disappears, a solution of 3.4 g. of 17α-ethinyl-19-nortestosterone-ethyleneketal in 60 cc. of absolute tetrahydrofurane are added dropwise during the time period of 15 minutes, the mixture is stirred for 30 minutes, the cooling bath removed, and the reaction mixture is stirred while passing dry nitrogen therethrough until all of the ammonia has been removed.

The solution is subsequently cooled to −80 to −60° C. and gaseous formyl fluoride is added thereto under slow stirring. After stirring for one hour in the cooling bath the mixture is diluted with methylene chloride, washed with water, dried and the solvent is evaporated. The oily residue is crystallized by rubbing with ether. By recrystallization from methanol there is obtained 0.57 g. of a formiate of 17α-ethinyl-19-nortestosterone-ethyleneketal having a melting point of 201–205° C. By subjecting the concentrated mother liquor to chromatography on silicic acid, 1.26 g. of a second isomeric formiate of 17α-ethinyl - 19 - nortestosterone-ethyleneketal is isolated having a melting point of 161–163° C. Both compounds yield after ketal splitting by approximately 20 minutes of heating and 90% acetic acid on a steam bath, whereby a portion of the formiate becomes again saponified, the compound 17α-ethinyl-19-nortestosterone-formiate having a melting point of 156–158° C. The ultraviolet absorption maximum at 239 mμ=17,060. The yield is 0.479 g.

EXAMPLE 2

*1-Ethinyl-Cyclohexane-1-Ol-Formiate*

1.2 g. of sodium in small pieces are introduced into 100 cc. of liquid ammonia after addition of a trace amount of ferric nitrate to the ammonia. A solution of 6.8 g. of ethinyl-cyclohexanol in 50 cc. of absolute tetrahydrofurane are added dropwise during a time period of 10 minutes to the sodium amide solution and the further working up proceeds as in Example 1. The obtained is dissolved in carbon tetrachloride and subjected to chromatography on silicic acid (10% water). It is then eluated with methylene chloride-carbon tetrachloride 1:1. The obtained 1-ethinyl-cyclohexane-1-ol-formiate boils at a pressure of 16 mm. Hg at between 84 and 85° C. The yield amounts to 3.72 g.

EXAMPLE 3

*17α-Ethinyl-19-Nortestosterone-Formiate*

After the addition of a trace amount of ferric nitrate to 100 cc. of liquid ammonia, 400 mg. of potassium are added thereto under stirring at a temperature of —80 to —60° C. As soon as the dark blue solution has become decolorized, a solution of 3.3 g. of 17α-ethinyl-19-nortestosterone-3-ethyl enol ether (melting point 171–172° C.) in 80 cc. of absolute dioxane are added dropwise under stirring during a time period of 15 minutes. The reaction mixture is removed from the cooling bath and stirred while passing dry nitrogen therethrough until all of the ammonia has been removed. The reaction mixture is subsequently cooled to —80 to —60° C. and formyl fluoride is added under slow stirring.

After stirring for 1 hour in a cooling bath the mixture is diluted with methylene chloride, washed with water until neutral, the methylene chloride solution is dried over sodium sulfate, and the solvent is distilled off under vacuum. By chromatography with methylene chloride on silicic acid the 17α-ethinyl-19-nortestosterone-formiate is isolated. The yield amounts to 0.48 g. The melting point of the compound is 157–158° C. The ultraviolet absorption maximum at 239 mμ:ε=17,000 $[α]_D^{25°}$ —37.6° (chloroform).

EXAMPLE 4

*1-Propinyl-Cyclohexanole-Formiate*

After the addition of a trace of ferric nitrate to 150 cc. of liquid ammonia, 1.2 g. of sodium in small pieces are added under stirring at a temperature of —80 to —60° C. 6.9 g. of 1-propinyl-cyclohexanole, dissolved in 110 cc. of absolute tetrahydrofurane, are added to the sodium amide solution dropwise during a time period of 15 minutes.

After stirring for 2½ hours the reaction mixture is removed from the cooling bath, the ammonia is blown off with nitrogen, the mixture is subsequently cooled to —80 to —60° C., and formyl fluoride is added thereto. The further working up proceeds as in Example 1. The obtained oil is distilled under vacuum.

The resulting compound 1-propinyl-cyclohexane-1-ol-formiate is a colorless oil having a pleasant odor and boiling at a pressure of 4 mm. Hg at between 77 and 78° C. The yield is 4.1 g.

Without further analysis, the foregoing will so fully reveal the gist of the present invention that others can by applying current knowledge readily adapt it for the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

A method of producing a formic acid ester of the formula:

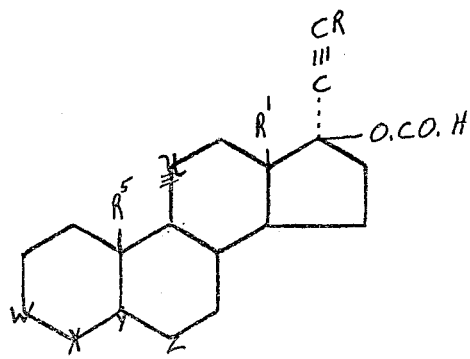

wherein R is selected from the group consisting of hydrogen and lower alkyl, wherein $R^1$ is methyl, wherein $R^5$ is selected from the group consisting of hydrogen and methyl, wherein U is selected from the group consisting of —CH$_2$—, —CHOacyl—, —CHOH— and —CO—, wherein W is selected from the group consisting of —CH$_2$—, —CO—, —CHOR$^2$— wherein $R^2$ is selected from the group consisting of hydrogen and lower alkyl, and

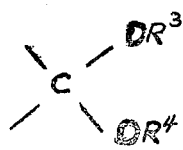

where $R^3$ by itself is selected from the group consisting of hydrogen and lower alkyl, $R^4$ by itself is lower alkyl, and $R^3$ and $R^4$ together are alkylene, and wherein

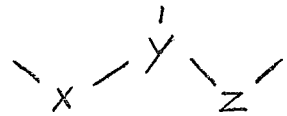

is selected from the group consisting of

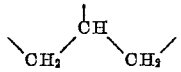

and

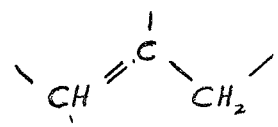

which comprises reacting a compound of the formula:

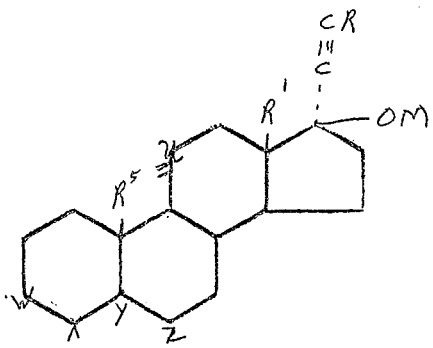

wherein R, $R^1$, $R^5$, U, W and

have the same definitions as above and wherein M is selected from the group consisting of hydrogen and alkali metals with gaseous formyl fluoride so as to form the corresponding formic acid ester of the formula given.

References Cited in the file of this patent

UNITED STATES PATENTS

| | | |
|---|---|---|
| 2,797,326 | Birbiglia et al. | June 25, 1957 |
| 2,843,608 | Colton | July 15, 1958 |
| 2,872,462 | Loechel et al. | Feb. 3, 1959 |
| 2,964,537 | Engelfried et al. | Dec. 13, 1960 |